United States Patent

[11] 3,624,203

[72] Inventor Gerhard Anthony Overbeek
         Nijmegen, Netherlands
[21] Appl. No. 2,418
[22] Filed Jan. 12, 1970
[45] Patented Nov. 30, 1971
[73] Assignee Organon Inc.
         West Orange, N.J.
[32] Priority Feb. 26, 1969
[33]         Netherlands
[31]         6903028

[54] PHARMACEUTICAL CONTRACEPTIVE PREPARATION
     5 Claims, No Drawings
[52] U.S. Cl. .................................................. 424/238
[51] Int. Cl. .............................................. A61k 27/00
[50] Field of Search ......................................... 424/238

[56]             References Cited
              FOREIGN PATENTS
     919,565  2/1963  Great Britain
     961,502  6/1964  Great Britain

*Primary Examiner*—Richard L. Huff
*Attorney*—Hugo E. Weisberger

ABSTRACT: The invention relates to the manufacture of novel pharmaceutical preparations and to oral dosage unit forms comprising as sole contraceptive material a gestagenic substance of the general formula:

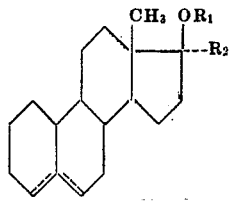

in which
$R_1$=H or an acyl group with one to four carbon atoms or an alkyl group with
one to two carbon atoms, and
$R_2$ = an alkyn group with two to four carbon atoms, which may contain halogen
and in which there is one ethylenic bond starting from carbon atom five to carbon atom four or six,
preferably in a quantity of from 0.1 to 0.4 mg. per dosage unit form. The invention comprises also the treatment for the prevention of conception consisting in administrating to females continuously with regular intervals, preferably daily, the dosage unit forms.

PHARMACEUTICAL CONTRACEPTIVE PREPARATION

The invention relates to a process for the manufacture of a novel pharmaceutical preparation and pharmaceutical dosage unit forms comprising the novel preparation, as well as to a method for the use of the relative pharmaceutical preparation.

BACKGROUND OF THE INVENTION

It is known to use combinations of gestagenic and oestrogenic substances as contraceptive preparations. These preparations are administered orally during periods of from 20 to 22 consecutive days. After such a period there occurs an ovulatory bleeding. The next period of administration is usually started on the fifth day after the onset of bleeding. This well-known method causes, at least in a number of individual cases, less desirable side-effects such as a feeling of discomfort, increase in weight and so-called breakthrough bleedings.

SUMMARY OF THE INVENTION

It has now been found that conception can be prevented in a reliable manner without such undesirable side-effects and without the normal ovulation pattern being disturbed. This can be achieved by oral administration of certain gestagenic substances, in the absence of oestrogenic substances, in considerably lower dosages than those given before now. Moreover administration no longer takes place cyclically but continuously with regular intervals, usually of one day.

So the invention comprises a novel pharmaceutical preparation containing as contraceptive material only one or more gestagenic substances of the general formula:

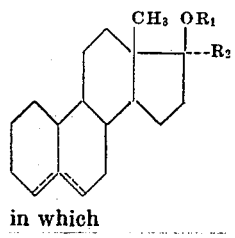

in which $R_1$ = H or an acyl group with one to four carbon atoms or an alkyl group with one to two carbon atoms, and
$R_2$ = an alkyn group with two to four carbon atoms, which may contain halogen
and in which there is one ethylenic bond starting from carbon atom five to carbon atom four or six,
in a suitable dosage form.

Compounds to be used in the dosage forms according to the invention are i.a.:
$\Delta^4$—17α-ethynyloestrene-17β-ol, $\Delta^4$-17α-propargyloestrene-17β-ol, $\Delta^5$-17α-ethynyloestrene-17β-ol, $\Delta^5$-17α-propynyloestrene-17β-ol-ethylether, $\Delta^4$-17α-propynyloestrene-17β-ol, $\Delta^5$-17α-propynyloestrene-17β-ol-acetate, $\Delta^4$-17α-butynyloestrene-17β-ol, $\Delta^5$-17α-propargyloestrene-17β-ol-butyrate.

The quantity of gestagenic substance per dosage unit form can amount to 0.1–0.4 mg. Preferably 0.15–0.25 mg. of gestagenic substance is used per dosage unit, $\Delta^4$-17α-ethynyloestrene-17β-ol, $\Delta^4$-17α-propargyloestrene-17β-ol, $\Delta^4$-17α-ethynyloestrene-17β-ol-acetate and $\Delta^4$-17α-propynyloestrene-17β-ol being preferably used as the gestagenic substance.

The invention also comprises a process for the manufacture of a pharmaceutical preparation which contains as contraceptive material only one or more gestagenic substances of the above formula in a form suitable for administration.

Moreover the invention comprises a method for the prevention of conception by continuous administration, with regular intervals, of pharmaceutical preparations containing as contraceptive material only one or more gestagenic substances, in a suitable dosage form, which substances have the above formula.

As stated above the dosages are preferably given with intervals of one day so that the taking of the medicine is simply a question of routine, while other ways of dosing always require an aid to memory. It is also possible, however, especially with the higher concentrations within the scope of the invention, to administer the dosages with an interval of two days between two consecutive dosages.

DESCRIPTION OF THE PREFERRED EMBODIMENTS

The following examples serve to illustrate the invention:

EXAMPLE I

Tablets containing the following components per tablet:

| | |
|---|---|
| $\Delta^4$-17α-ethynyloestrene-17β-ol | 0.25 mg. |
| potato starch | 20.25 mg. |
| glycerol (100%) | 1.85 mg. |
| magnesium stearate | 1 mg. |
| talcum | 4 mg. |
| α-tocoferol | 0.2 mg. |
| lactose | 100 mg. | were manufactured by mixing the above-mentioned components and tableting them.

These tablets were taken daily for 6 months (1 tablet per day) by 59 subjects of proven fertility. The subjects were under control during the whole test period.
The following was observed:
No increase in weight;
No pregnancies during the test period;
No systemic side-effects;
Regular cycle.

EXAMPLE II

Tablets of the following composition were manufactured in accordance with example I:

| | |
|---|---|
| $\Delta^5$-17α-propynyloestrene-17β-ol-acetate | 0.4 mg. |
| potato starch | 20.10 mg. |
| stearic acid | 1 mg. |
| talcum | 4 mg. |
| α-tocoferol | 0.2 mg. |
| lactose | 100 mg. |

These tablets were taken daily for 6 months (1 tablet per day) by 48 subjects of proven fertility. The subjects were under control during the whole test period. The observations were equal to those in example I.

EXAMPLE III

Tablets were manufactured in accordance with example I, but instead of $\Delta^4$-17α-ethynyloestrene-17β-ol 0.25 mg. $\Delta^4$-17α-propynyloestrene-17β-ol was used.

The effect observed in 53 subjects during a period of 6 months was equal to that in example I.

EXAMPLE IV

Tablets in accordance with example II were used in rotation with tablets without gestagenic component, their composition otherwise being the same. This was done during a period of 6 months by 47 subjects. The tablets containing a gestagenic substance were invariably taken every other day. The effect was the same as in example I.

Comparative tests with other gestagenic preparations having the same concentration showed that, unlike the preparations according to the invention, these preparations produce undesirable side-effects such as depression, headache, unpleasant systemic effects and/or irregularity of menses.

What is claimed is:
1. A pharmaceutical preparation in dosage unit form having a contraceptive action, containing as its sole active ingredient a gestagenic substance of the formula:

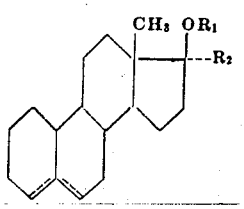

in which $R_1$ is selected from the group consisting of H, acyl having one to four carbon atoms and alkyl having one to two carbon atoms, $R_2$ is alkyne having two to four carbon atoms, and in which there is one ethylenic bond selected from the group consisting of $\Delta^{4(5)}$ and $\Delta^{5(6)}$, in an effective contraceptive dosage range from 0.1 to 0.4 milligrams, together with a pharmaceutically acceptable carrier.

2. The pharmaceutical dosage unit form of claim 1 containing $\Delta^4$-17$\alpha$-propynyloestrene-17$\beta$-ol as gestagenic substance.

3. The pharmaceutical dosage unit form of claim 1 containing $\Delta^4$-17$\alpha$-propynyloestrene-17$\beta$-ol-acetate as gestagenic substance.

4. The pharmaceutical dosage unit form of claim 1 containing 0.15 to 0.25 mg. of gestagenic substance per dosage unit.

5. Method for the prevention of pregnancy consisting in administering to a woman serially at regular intervals an oral pharmaceutical preparation in dosage unit form having a contraceptive action, containing as its sole active ingredient a gestagenic substance of the formula:

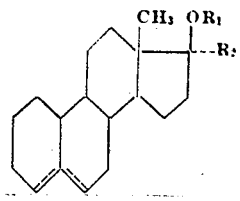

in which $R_1$ is selected from the group consisting of H, acyl having one to four carbon atoms and alkyl having one to two carbon atoms, $R_2$ is alkyne having two to four carbon atoms, and in which there is one ethylenic bond selected from the group consisting of $\Delta^{4(5)}$ and $\Delta^{5(6)}$, in an effective contraceptive dosage range from 0.1 to 0.4 milligrams, together with a pharmaceutically acceptable carrier.

* * * * *